United States Patent [19]
King, Jr. et al.

[11] 3,730,540
[45] May 1, 1973

[54] TOOL HOLDER WITH SPRING OPERATED NUT

[75] Inventors: John L. King, Jr.; Roland G. Koch, both of Frankenmuth, Mich.

[73] Assignee: Houdaille Industries, Inc., Buffalo, N.Y.

[22] Filed: Sept. 9, 1971

[21] Appl. No.: 178,920

[52] U.S. Cl. ............................................ 279/91, 279/1 B
[51] Int. Cl. .............................................. B23b 31/04
[58] Field of Search ................................ 279/91, 1 B

[56] References Cited

UNITED STATES PATENTS 3,663,028   5/1972   King et al. .................... 279/91

*Primary Examiner*—Francis S. Husar
*Attorney*—Carlton Hill et al.

[57] ABSTRACT

A tool holder includes a hollow supporting member on which there is threaded a locking ring which is urged to its locked position by a spring, there being a combined latch and release pin for holding the locking ring in the unlocked position, and responsive to the reception of a tool to be automatically released for automatically tightening the locking ring. The locking ring has an ear that is received between shoulders that encircle the tool so that tightening of the ring cams the tool into the supporting member, and loosening of the ring cams the tool out of the supporting member.

16 Claims, 8 Drawing Figures

INVENTORS
JOHN L. KING, JR.
ROLAND G. KOCH
BY [signature] ATTORNEYS

PATENTED MAY 1 1973 3,730,540

INVENTORS
JOHN L. KING, JR.
ROLAND G. KOCH

BY Hill, Sherman, Meroni, Gross & Simpson ATTORNEYS

TOOL HOLDER WITH SPRING OPERATED NUT

BACKGROUND OF THE INVENTION

1. Field of the Invention

This invention relates generally to a tool holder, and more specifically to a tool holder that automatically locks onto a tool adapter in response to insertion of such adapter in the holder.

2. Prior Art

A tool holder having a hollow supporting member and a locking ring threaded thereon for movement between angular limits defined by a pair of pins is shown in U.S. Pat. No. 2,719,722, which is owned by the assignee of the present invention.

A modification of the structure of U.S. Pat. No. 2,719,722 is shown in U.S. Pat. No. 3,512,793 wherein a latch mechanism has been provided by two separately movable pins respectively biased by separate springs, and respectively retained in the supporting member by separate threaded plugs.

SUMMARY OF THE INVENTION

According to our invention, a tool holder has been provided with a spring-operated nut under the control of a latch mechanism. The nut contains ear means that are received through slot means in the tool or tool adapter so as to enter the space between a pair of axially spaced shoulders on the tool or tool adapter whereby the spring-operated nut not only locks the tool or tool adapter into position, but also positively drives the same and positively unlocks the same.

Accordingly, it is an object of the present invention to provide a tool holder having a spring-operated nut.

A further object of the present invention is to provide in the environment set forth a simple latch mechanism for such nut.

A still further object of the present invention is to provide a tool holder of simplified construction.

Another object of the present invention is to provide a tool holder of the type described which is so arranged as to keep a maximum amount of foreign matter out of the mechanism by which the nut is spring-operated and retained.

Many other advantages, features and additional objects of the present invention will become manifest to those versed in the art upon making reference to the detailed description and the accompanying drawings in which preferred structural embodiments incorporating the principles of the present invention are shown by way of illustrative example.

ON THE DRAWINGS

AS SHOWN IN THE DRAWINGS

Figure 1:
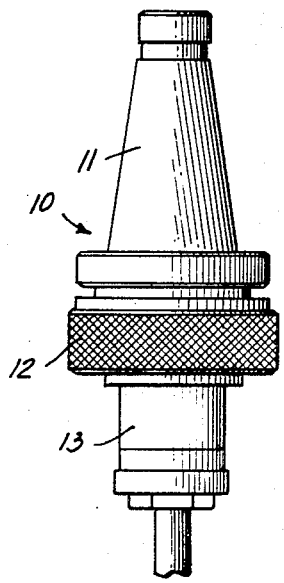
FIG. 1 is an elevational view of a tool holder assembly provided in accordance with the principles of the present invention, including a tool or tool adapter.
Figure 2:
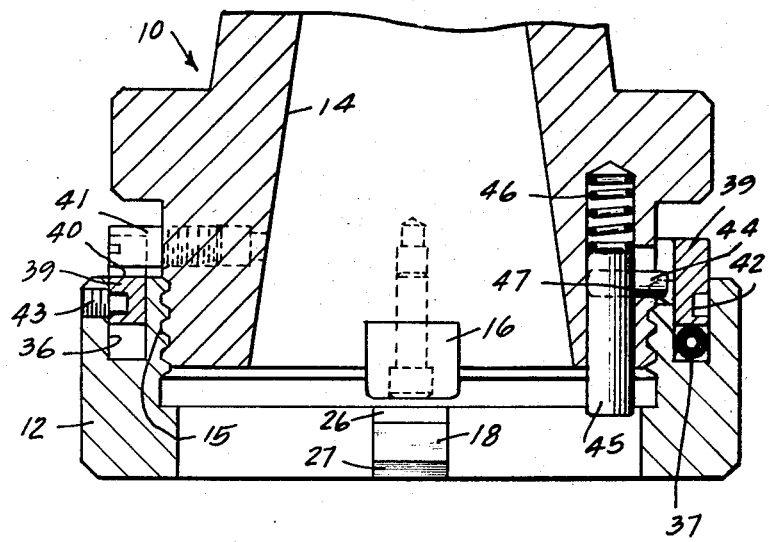
FIG. 2 is a fragmentary vertical cross-sectional view of the tool holder assembly taken along line II—II of FIG. 3.
Figure 3:
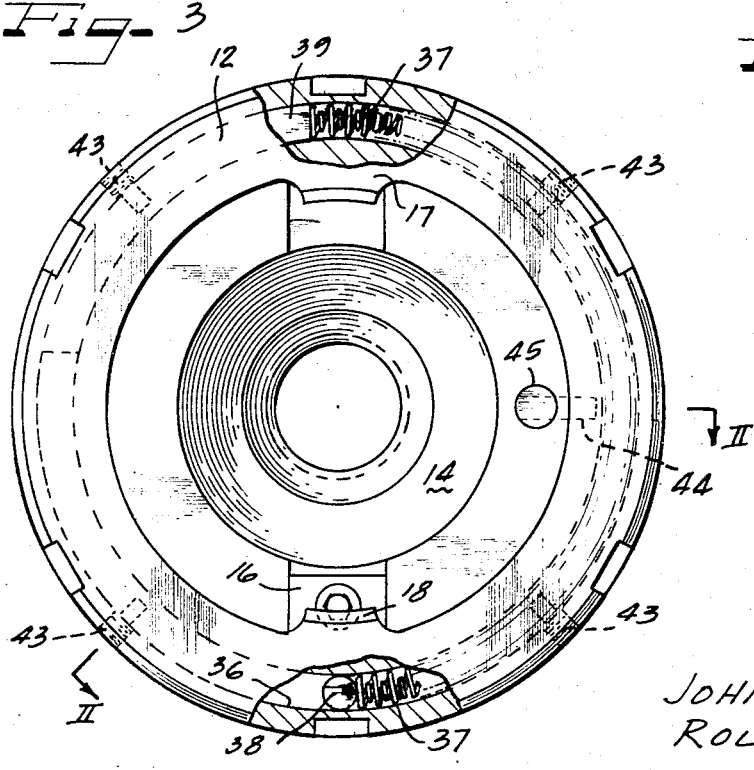
FIG. 3 is a bottom view of the structure of FIG. 2.

The principles of the present invention are particularly useful when embodied in a tool holder assembly such as illustrated in FIG. 1, generally indicated by the numeral 10. The tool holder assembly 10 includes a hollow supporting member 11 and a locking ring 12. When the hollow supporting member 11 and the threaded locking ring 12 are assembled with each other as shown in FIGS. 2 and 3, they are receptive of a tool or tool adapter 13, hereafter jointly referred to as "tool" also shown in FIGS. 5 and 6.

The hollow supporting member 11 is adapted at its upper illustrated end to be secured to the rotatable spindle of a machine tool (not shown) to be driven thereby. The supporting member 11 has a tapered bore 14 complemental to the tapered exterior of the tool 13 which is receivable therein. The supporting member 11 has a threaded end portion 15 onto which the threaded locking ring 12 is carried. The supporting member 11 has one end preferably two axially directed drive lugs 16 preferably disposed diametrically opposite to each other, and thus eccentrically to the rotational axis.

The threaded locking ring 12 has at least one and preferably has two radially inwardly projecting ears 17,18.

Figure 6:
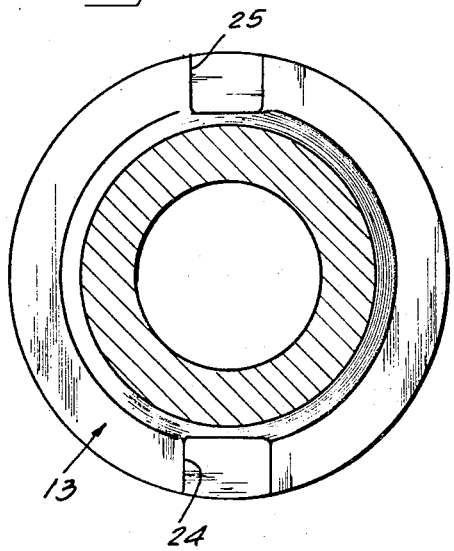
FIG. 6 is a top view, partially in cross section, taken along line VI—VI of FIG. 5.
Figure 5:
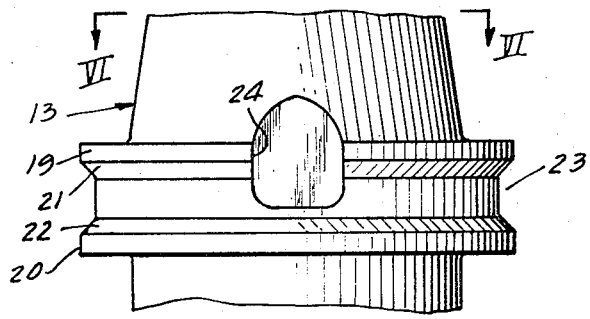
FIG. 5 is a fragmentary elevational view of a portion of a tool or tool adapter receivable in the tool holder of FIG. 2.

As shown in FIGS. 5 and 6, the tool 13 has a pair of axially spaced flanges 19,20 which have a pair of confronting faces that define a pair of axially spaced shoulders 21,22 The spaced shoulders 21,22 define a groove 23 of frusto-conical radial cross section. In the shoulder 19 there is one and preferably two slots 24,25, each slot 24,25 being blocked by the shoulder 22 as best seen in FIG. 5. When the tool 13 is inserted in the tool holder assembly 10, the radially inwardly projecting ears 17,18 are received in the slots 24,25. When the locking ring 12 is rotated, the ears 17,18 enter the groove 23, and for that reason are constructed of corresponding radial cross section. As seen in FIG. 2, the ear 18 has a seating cam surface 26 which engages the shoulder 21 to urge the tool 13 into the recess 14. When the nut 12 is rotated in the opposite direction, an unseating cam surface 27 on the ear 18 engages the shoulder 22 to urge the tool 13 out of the tapered recess 14.

When the tool 13 has been inserted so that the ear 17 has entered the slot 24, further axial movement of the tool 13 causes the drive lug 16 and its associated drive lug (not shown) to enter the slots 24,25 to provide a positive angular driving connection between the supporting member 11 and the tool 13.

Frequently it is desirable that the tool be received only in one predetermined angular relationship. Accordingly, the ear 17 and the slot 24 are made wider than the ear 18 and the slot 25 respectively. The wider ear 17 is wider than the narrower slot 25 whereby the tool 13 can be received in only one angular position with respect to the tool holder assembly 10.

As explained below, the locking ring 12 has a locked and an unlocked position, and the drive lug 16 is aligned with the ear 18 when the locking ring 12 is in the unlocked position whereby it is receivable in and removable from the tool slot 25. Thus the supporting member 11, the tool 13 and the locking ring 12 jointly have means to lock the tool 13 onto the supporting member 11 for driven corotation.

Figure 7:
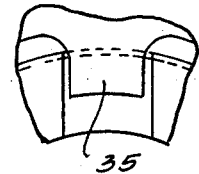
FIG. 7 is a fragmentary view showing a modified form of tool holder assembly.
Figure 8:
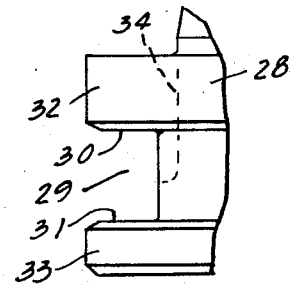
FIG. 8 is a fragmentary view of a portion of a tool or tool adapter used with the tool holder of FIG. 7.

If desired, the tool 13 may be modified as shown in FIG. 8 so that in place of having a groove 23 of frustoconical radial section, a tool 28 can be provided which has a groove 29 of substantially rectangular radial cross section defined by a pair of shoulders 30,31 carried on a pair of flanges 32,33. The flange 32 is slotted as at 34 to receive a radially inwardly projecting ear 35, shown in FIG. 7 and which is of corresponding radial cross section, the ear 35 being receivable in the groove 29 through the slot 34 and having upper and lower surfaces for engaging the shoulders 30,31 to seat and unseat the tool 28 as previously explained.

The locking ring 12 has an annular groove 36 which opens in an axial direction, the bottom or inner end of the groove providing a space for a lock spring 37, in this embodiment there being a pair of such lock springs disposed concentrically within each other. The term "lock spring" is thus intended to encompass both a single and concentric lock springs. The groove 36 thus encircles the rotational axis of the tool assembly 10. The lock spring 37 acts between the supporting member 11 and the locking ring 12. As shown in FIG. 3, the locking ring 12 has an abutment member 38 fixed thereto within the annular groove 36 so that the lock spring 37 may abut thereagainst. The opposite end of the lock spring 37 bears against a retaining member 39 and receives a reactive force from it whereby the lock spring 37 urges the locking ring 12 to move to the locked position wherein the ears 17,18 are disposed within the groove 23 remotely from the slots 24,25. Means are provided to act between the supporting member 11 and the retaining member 39 to substantially preclude angular movement therebetween. To this end, the retaining member has a slot 40 within which there is disposed a holding pin 41 that is threaded into the supporting member 11. The width of the slot 40 is substantially the same as the width or diameter of the holding pin 41. The means 40,41, however, enable slight relative axial movement between the supporting member 11 and the retaining member 39 so that the space occupied by the lock spring 37 is substantially a constant.

Figure 4:
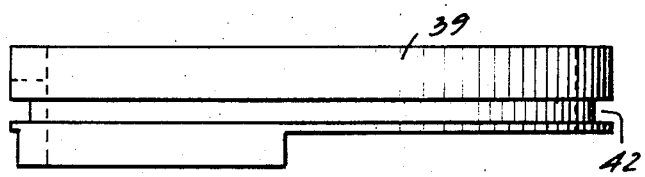
FIG. 4 is an elevational view of a retaining member shown in FIG. 2.

There is a pin-and-slot connection between the retaining member 39 and the locking ring 12 which holds the retaining member 39 in the groove 36 while enabling the locking ring to rotate with respect to the retaining member between the locked and the unlocked positions. To this end, a circumferential slot 42 is provided on the retaining member 39 as best seen in FIG. 4, and a set of four threaded pins 43 is carried by the locking ring and projects into the slot 42.

When the locking ring 12 is rotated from its locked position against the force of the lock spring 37 to the position illustrated in FIGS. 2 and 3, energy is stored in the lock spring 37. Such energy is retained therein by a latch pin 44 which has a rigid connection with a release pin 45, the release pin 45 being urged by a spring 46 to seat the latch pin 44 in an axially directed slot 47 on the locking ring 12 and which is encircled by the retaining member 39. Thus the latch pin 44 moves parallel to the rotational axis of the tool holder assembly 10 and parallel to the rotational axis of the locking ring 12 into a position in the axially directed slot 47 where it holds the locking ring 12 in the unlocked position. The release pin 45 projects transversely from the latch pin and is directed and is of such length so as to be engaged by an incoming tool 13, and in particular, to be engaged by the flange 19 or 32. Only one of the pins 44,45, namely the release pin 45 is directly slidably carried by the supporting member 11 for movement along the length of such pin 45 in a direction parallel to the rotational axis of the supporting member 11. The spring 46 thus urges the release pin toward the tool to engage the tool flange 19,32 remotely from the flange slots. The latch pin 44 projects substantially radially with respect to the axis of the release pin 45 and substantially radially with respect to the rotational axis of the tool holder assembly 10.

When the tool 13 is inserted as explained previously, the flange 19, 32 engages the lower end of the release pin 45, and moves it against the force of the spring 46, thereby retracting the latch pin 44 from the axially directed slot 47 in the locking ring 12, and once the latch pin 44 emerges therefrom, the lock spring 37 automatically rotates the threaded locking ring 12 to provide positive seating of the tool and locking of the tool as previously explained.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A tool holder assembly, comprising:
   a. a hollow supporting member adapted to be secured to a machine tool spindle, having a recess for receiving a tool, and having a threaded end portion;
   b. a tool having a portion receivable in said recess, and a pair of axially spaced shoulders defining a groove encircling said tool outside of said recess, the shoulder nearer to said recess having at least one slot therethrough communicating with said groove and blocked by the other shoulder;
   c. a threaded locking ring carried on said threaded end portion, and having a radially inwardly projecting ear sized to pass through said one slot and to move angularly in said groove between a locked and an unlocked position of said locking ring;
   d. a lock spring acting between said supporting member and said locking ring, and urging said locking ring to move to the locked position;
   e. a latch pin movable in a direction parallel to the rotational axis of said locking ring into a position where it holds said locking ring in the unlocked position;
   f. a release pin having a rigid connection with said latch pin and projecting transversely therefrom such that it can be engaged by the tool as the tool is received by said supporting member;
   g. only one of said pins being directly slidably carried by said supporting member for movement along its length in a direction parallel to the rotational axis of the supporting member; and
   h. a spring urging said one pin toward said tool.

2. A tool holder assembly according to claim 1 in which said supporting member has an axially directed drive lug angularly aligned with said ear when said locking ring is in the unlocked position, and receivable in said tool slot.

3. A tool holder assembly according to claim 2 which includes two of said tool shoulder slots and two of said drive lugs.

4. A tool holder assembly according to claim 3 in which said slots and said shoulders are so arranged that said tool is receivable in only one angularly orientated position.

5. A tool holder assembly according to claim 4 in which said slots and said lugs are disposed diametrically of each other and are of unlike slot size and unlike lug size, the larger lug being larger than the smaller slot to preclude reception therein.

6. A tool holder assembly according to claim 1 in which said groove and said ear have frustoconical radial cross sections which coact.

7. A tool holder assembly according to claim 1 in which said groove and said ear have substantially rectangular radial cross sections which coact.

8. A tool holder assembly according to claim 1 in which said shoulders comprise confronting faces on a pair of axially spaced flanges.

9. A tool holder assembly according to claim 1, said one of said pins being said release pin, and disposed to be engaged by a flange on said tool having said slotted shoulder, said latch pin projecting in a substantially radial direction with respect to the rotational axis of the supporting member and receivable into an axially directed slot in said locking ring in the locked position.

10. A tool holder assembly, comprising:
 a. a hollow supporting member adapted to be secured to a machine tool spindle, having a recess for receiving a tool, and having a threaded end portion;
 b. a tool having a portion receivable in said recess, said tool having a flange;
 c. a threaded locking ring carried on said threaded end portion and movable between a locked and an unlocked position;
 d. means on said supporting member, on said tool and on said locking ring to lock said tool onto said supporting member for driven corotation;
 e. a lock spring acting between said supporting member and said locking ring and urging said locking ring to move to the locked position;
 f. a release pin directly slidably carried by said supporting member for movement along its length in a direction parallel to the rotational axis of said supporting member, and disposed to be engaged by said tool flange as said tool is received by said supporting member;
 g. a latch pin having a rigid connection with said release pin and projecting substantially radially therefrom and receivable into an axially directed slot in said locking ring in the locked position; and
 h. a spring urging said release pin toward said tool.

11. A tool holder according to claim 10 in which said locking ring has an annular groove which opens axially, within which said lock spring is disposed, and which groove encircles the rotational axis and said axially directed slot.

12. A tool holder according to claim 11, including a retaining member holding said spring in said annular groove, said supporting member reacting through said retaining member on said lock spring.

13. A tool holder according to claim 12 including an abutment member fixedly carried by said locking ring in said annular groove and against which said lock spring acts.

14. A tool holder according to claim 12 in which said retaining member is a ring closing the open end of said annular groove.

15. A tool holder according to claim 12 which includes a means acting between said supporting member and said retaining member for substantially precluding relative angular movement therebetween.

16. A tool holder according to claim 15 including a pin and slot connection between said retaining member and said locking ring for holding said retaining member in said annular groove while enabling said locking ring to be rotated between said positions.

* * * * *